(12) United States Patent
Saito

(10) Patent No.: US 9,427,665 B2
(45) Date of Patent: Aug. 30, 2016

(54) GAME PROVIDING SERVER

(71) Applicant: Sony Computer Entertainment Inc., Tokyo (JP)

(72) Inventor: Hideyuki Saito, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/663,669

(22) Filed: Mar. 20, 2015

(65) Prior Publication Data
US 2015/0273330 A1   Oct. 1, 2015

(30) Foreign Application Priority Data

Apr. 1, 2014   (JP) .................. 2014-075606

(51) Int. Cl.
| | | |
|---|---|---|
| A63F 9/24 | (2006.01) | |
| A63F 13/355 | (2014.01) | |
| A63F 13/30 | (2014.01) | |

(52) U.S. Cl.
CPC ............. *A63F 13/355* (2014.09); *A63F 13/30* (2014.09); *A63F 2300/534* (2013.01); *A63F 2300/66* (2013.01)

(58) Field of Classification Search
None
See application file for complete search history.

(56) References Cited

U.S. PATENT DOCUMENTS

| | | | |
|---|---|---|---|
| 8,339,679 B2 | 12/2012 | Tsujii | |
| 8,435,121 B1 * | 5/2013 | Fisher et al. | 463/42 |
| 8,582,033 B2 | 11/2013 | Sawada | |
| 9,117,285 B2 | 8/2015 | Clemie | |
| 2006/0072831 A1 | 4/2006 | Pallister | |
| 2010/0046036 A1 | 2/2010 | Tsujii | |
| 2012/0050614 A1 | 3/2012 | Sawada | |
| 2012/0149464 A1 * | 6/2012 | Bone et al. | 463/30 |
| 2014/0111529 A1 | 4/2014 | Clemie | |

FOREIGN PATENT DOCUMENTS

| | | |
|---|---|---|
| JP | 2000042247 A | 2/2000 |
| JP | 2005519382 | 6/2005 |
| JP | 2010050932 A | 3/2010 |
| WO | 03075116 A2 | 9/2003 |
| WO | 2010134482 A1 | 11/2010 |

OTHER PUBLICATIONS

Office Action for corresponding JP Patent No. 2014-075606, 9 pages, dated Mar. 22, 2016.
Roadmap Check-Reform of cloud computing which NVIDIA aspires for, Nikkei WinPC, vol. 18, No. 11, Nikkei Business Publications, Inc., 3 pages, dated Jun. 29, 2012. (for relevancy see Office Action for corresponding JP Patent No. 2014-075606, 9 pages, dated Mar. 22, 2016 cited above).

* cited by examiner

*Primary Examiner* — Paul A D'Agostino
(74) *Attorney, Agent, or Firm* — Matthew B. Dernier, Esq.

(57) ABSTRACT

A game providing server which decreases the latency in a cloud gaming service is disclosed. In the game providing server, a graphics processor generates a picture of a game to be distributed to a client through a network. A memory stores picture data generated by the graphics processor. The graphics processor converts the color system of the picture data of a predetermined data amount using it as a trigger that the picture data of the predetermined data amount is stored into the memory. An encoding unit converts the picture data of a predetermined color system into encoded data to be used upon distribution of the picture data to the client through the network. The graphics processor changes the picture data stored in the memory to picture data of a color system which can be encoded by the encoding unit.

5 Claims, 7 Drawing Sheets

F I G . 5
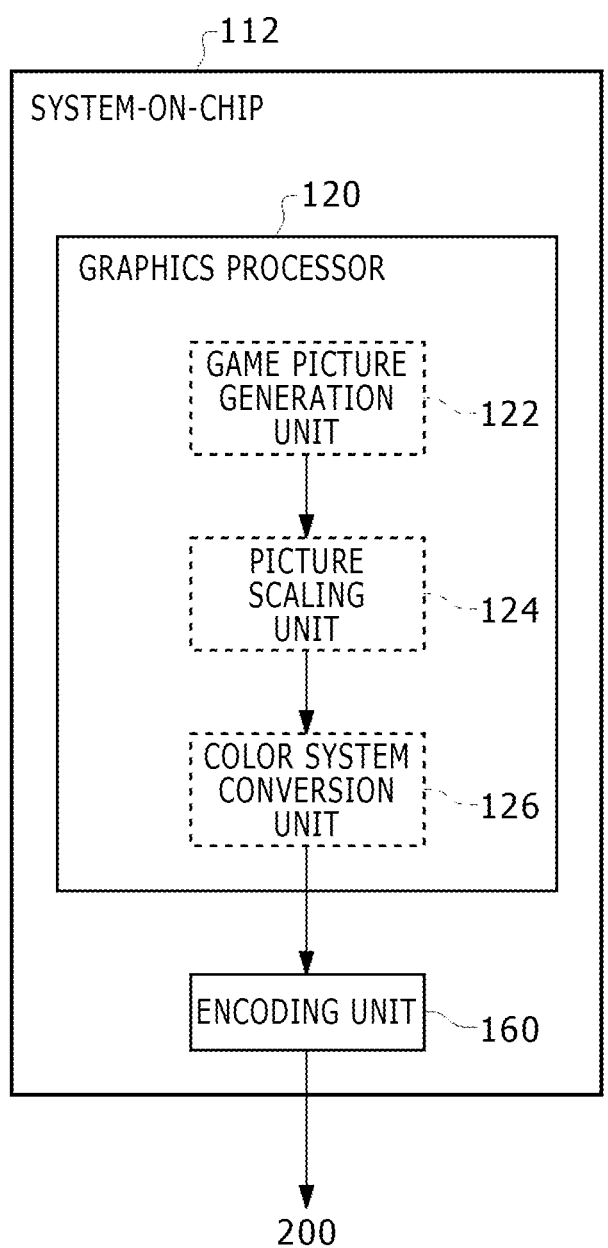

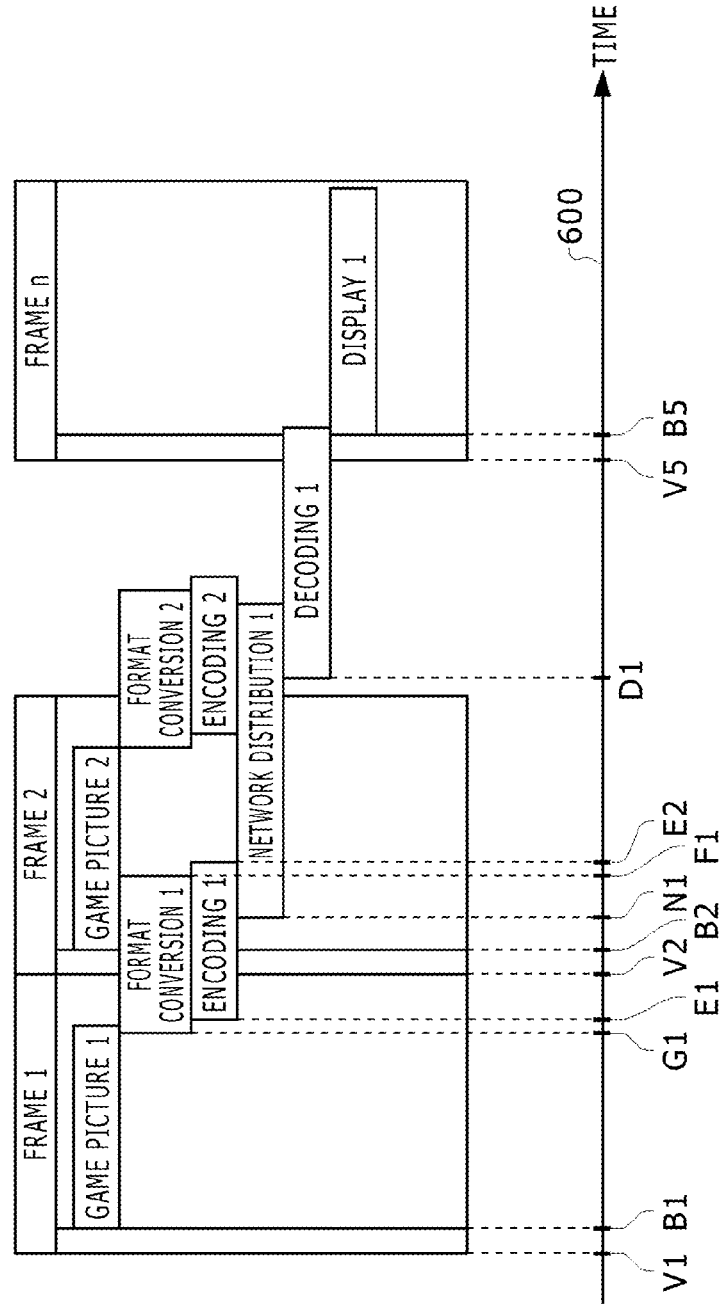

GAME PROVIDING SERVER

BACKGROUND

The present technology relates to a game providing server.

In recent years, communication technologies of a network beginning with the Internet have developed rapidly, and a cloud service by which a user receives the provision of various applications through a network has become to be provided. Where the cloud service is utilized, it is possible for a user to utilize an application even if the user itself does not possess the application program.

Further, computer technologies have exhibited a significant evolution in recent years. In the past, an application which requires a high calculation cost like a game application is usually caused to operate on a game machine of the installation type or a portable game machine for exclusive use. Those game machines are generally used in a standalone form in which they operate independently of any other apparatus. However, together with the development of network communication technologies, also a cloud gaming service has been implemented by which an application for a game or the like is executed on a cloud server and a result of the execution is streaming distributed to a client apparatus through a network.

SUMMARY

In an application for a game or the like, the progress of the game generally changes in response to an operation of a user carried out on a client apparatus. An operation of a user is transmitted from the client apparatus to a game providing server through a network. The game providing server progresses the game in response to the operation of the user and generates a picture of a result of the progress of the game. The picture generated by the game providing server undergoes predetermined processes and is transmitted to the client apparatus through the network.

In this manner, in the cloud gaming service, there is a tendency that the latency or delay time until an operation of a user carried out on a client apparatus is reflected on the progress of the game increases in comparison with that in another case in which the game is executed on a game machine of the standalone type.

It is desirable for the present technology to provide a game providing server which decreases the latency in a cloud gaming service.

In order to solve the problem described above, according to the present technology, there is provided a game providing server including a graphics processor configured to generate a picture of a game to be distributed to a client through a network, and a memory configured to store picture data generated by the graphics processor, the graphics processor converting a color system of the picture data of a predetermined data amount using it as a trigger that the picture data of the predetermined data amount is stored into the memory.

It is to be noted that an arbitrary combination of the components described above and representations of the present technology where they are converted between a method, an apparatus, a system, a computer program, a data structure, a recording medium and so forth are valid as modes of the present technology. The computer program may be provided as part of firmware which is incorporated in an apparatus in order to carry out basic control of hardware resources which implements the graphics processor. This firmware is stored in a semiconductor memory in the apparatus such as a ROM (Read Only Memory) or a flash memory. In order to provide this firmware or in order to update part of the firmware, a computer-readable recording medium on which the program is recorded may be provided, or the program may be transmitted by a communication line.

With the present technology, a game providing server for reducing the latency in a cloud gaming service can be provided.

BRIEF DESCRIPTION OF THE DRAWINGS

FIG. 5 is a block diagram schematically depicting an internal configuration of a system-on-chip which implements a function of a game providing server according to the embodiment;

FIG. 7 is a diagrammatic view schematically illustrating a flow of provision of a game picture in the configuration of the game providing server depicted in FIG. 4.

DETAILED DESCRIPTION OF THE PREFERRED EMBODIMENT

An outline of an embodiment of the present technology is described. In a game providing server according to the embodiment of the present technology, a compute shader built in a graphics processor executes an enlargement process or a reduction process (hereinafter referred to as "scaling process") and conversion of the color system of a game picture without depending upon a display output. Further, a graphics processor and an encoding unit which is a video encoder are installed in the same chip, and the encoding unit generates a compression picture stream without using the display output.

Figure 1:
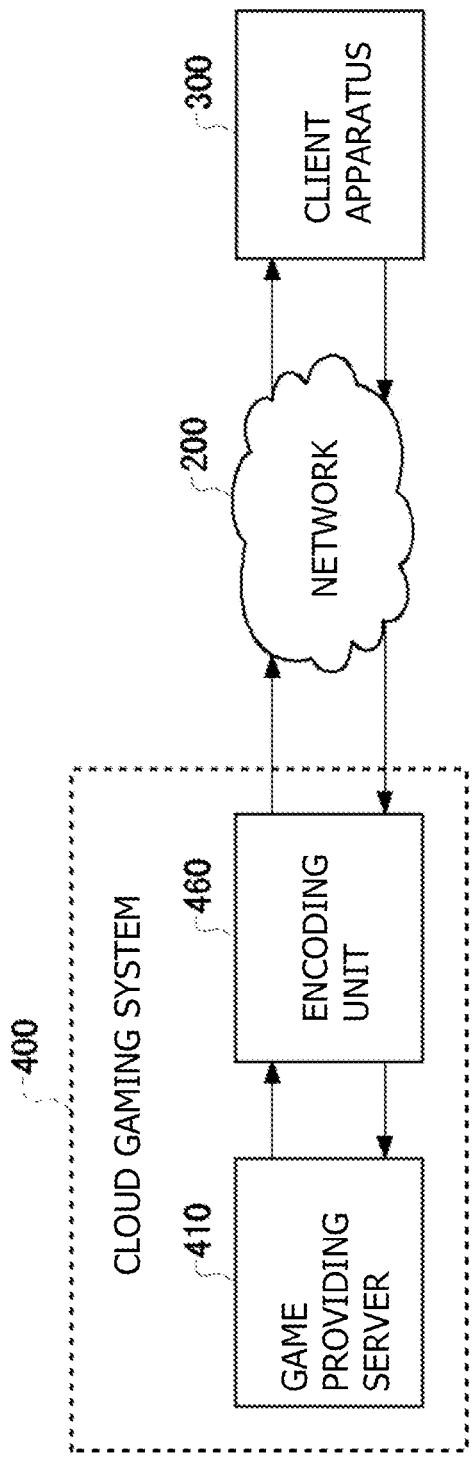
FIG. 1 is a block diagram depicting a general cloud gaming system and a client apparatus connected to the cloud gaming system through a network.

FIG. 1 is a block diagram depicting a general cloud gaming system 400, and a client apparatus 300 connected to the cloud gaming system 400 through a network 200.

The cloud gaming system 400 includes at least a game providing server 410 and an encoding unit 460. The game providing server 410 generates a picture of a game for being provided to a user of the client apparatus 300. A picture of a game generated by rendering by the game providing server 410 is streaming distributed to the client apparatus 300 through the network 200. Therefore, the encoding unit 460 encodes the picture of the game generated by the game providing server 410 in accordance with a video compression standard such as, for example, H.264.

The client apparatus 300 decodes and displays a picture acquired through the network 200. Therefore, the client apparatus 300 is an apparatus having at least computing power for decoding and displaying a picture of a game and may be, for example, a game machine or a PC (Personal Computer) of the installation type, a portable game machine, a smartphone or a tablet, a phablet, an electronic dictionary or an electronic book terminal. The client apparatus 300 transmits an operation of a user acquired through an input interface (not depicted) such as a keyboard or a controller to the game providing server 410 through the network 200.

When a game is to be executed using the cloud gaming system 400, the latency until an input to an input interface is reflected on a picture of a game displayed on the client apparatus 300 is long in comparison with that in a general game console executed in a standalone form. The latency in the cloud gaming system 400 arises from the latency of the network 200 and also from encoding and decoding of a game picture, and there is a tendency that the latency arising from such encoding and decoding is increasing.

Figure 2:
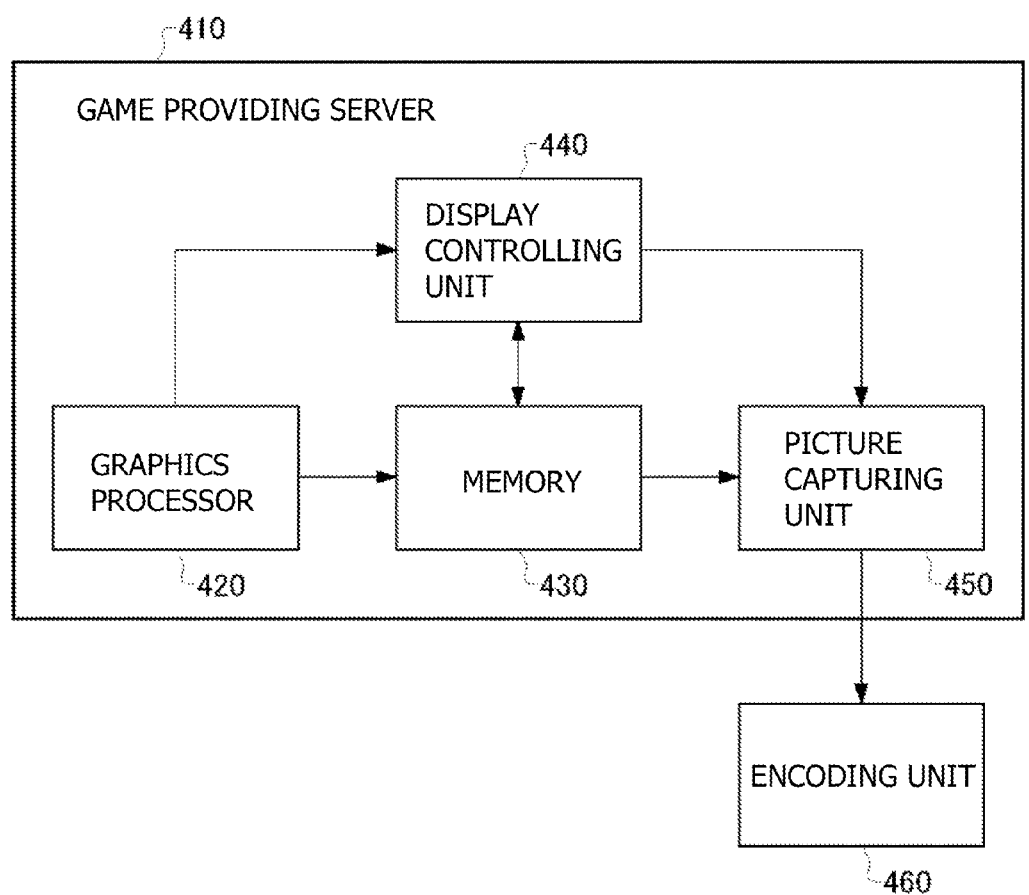
FIG. 2 is a block diagram illustrating a flow of a picture of a game in the cloud gaming system of FIG. 1.

FIG. 2 illustrates a flow of a picture of a game in the cloud gaming system 400. Referring to FIG. 2, the game providing server 410 includes a graphics processor 420, a memory 430 and a display controlling unit 440.

The graphics processor 420 is a processor responsible for the generation of a picture of a game provided by the game providing server 410 under the control of a CPU (Central Processing Unit) (not depicted) of the game providing server 410 and is generally called GPU (Graphics Processing Unit). The graphics processor 420 stores a picture of a game generated by rendering into the memory 430 which is a frame buffer.

The display controlling unit 440 is a controller generally called a display controller. The display controlling unit 440 converts a picture of a game stored in the memory 430 so as to be compatible with a format of a display output of the client apparatus 300 connected through the network 200. More particularly, the display controlling unit 440 reads out a picture of a game stored in the memory 430 and executes scaling of a picture and conversion of the color system of a picture hereinafter described in order to conform the picture to the display output format for the monitor of the client apparatus 300.

Since the game providing server 410 is a server which executes a game to be provided to the client apparatus 300, the game providing server 410 itself does not include a display device for displaying an execution screen image of a game. Therefore, the display controlling unit 440 connects to a picture capturing unit 450 in place of a display device and outputs an execution screen image to be displayed to the picture capturing unit 450. It is to be noted that, when the display controlling unit 440 outputs an execution screen image to the picture capturing unit 450, it executes scaling of a picture and conversion of the color system hereinafter described.

The picture capturing unit 450 fetches a picture of a game stored in the memory 430 under the control of the display controlling unit 440. More particularly, the display controlling unit 440 generates a VSYNC (vertical synchronizing signal), and the picture capturing unit 450 fetches a picture of a game in a unit of a frame using a vertical synchronizing signal generated by the display controlling unit 440 as a trigger.

The picture capturing unit 450 transmits the thus fetched picture to the encoding unit 460. The encoding unit 460 encodes the acquired picture based on a predetermined video compression standard and transmits the encoded picture to the client apparatus 300 through the network 200.

Here, the graphics processor 420 generally uses the RGB color system in which a unit of R (red), G (green) and B (blue) pixels is used to generate a picture of a game. In contrast, the encoding unit 460 is generally configured such that it encodes a picture of the YUV color system in which brightness and color difference signals are used. Therefore, as described hereinabove, the display controlling unit 440 converts a picture of the RGB color system generated by the graphics processor 420 into a picture of the YUV color system which can be used by the encoding unit 460.

The client apparatus 300 decodes an encoded picture acquired through the network 200 and displays a picture of a game under the control of a display controlling unit (not depicted) provided in the client apparatus 300.

Figure 3:
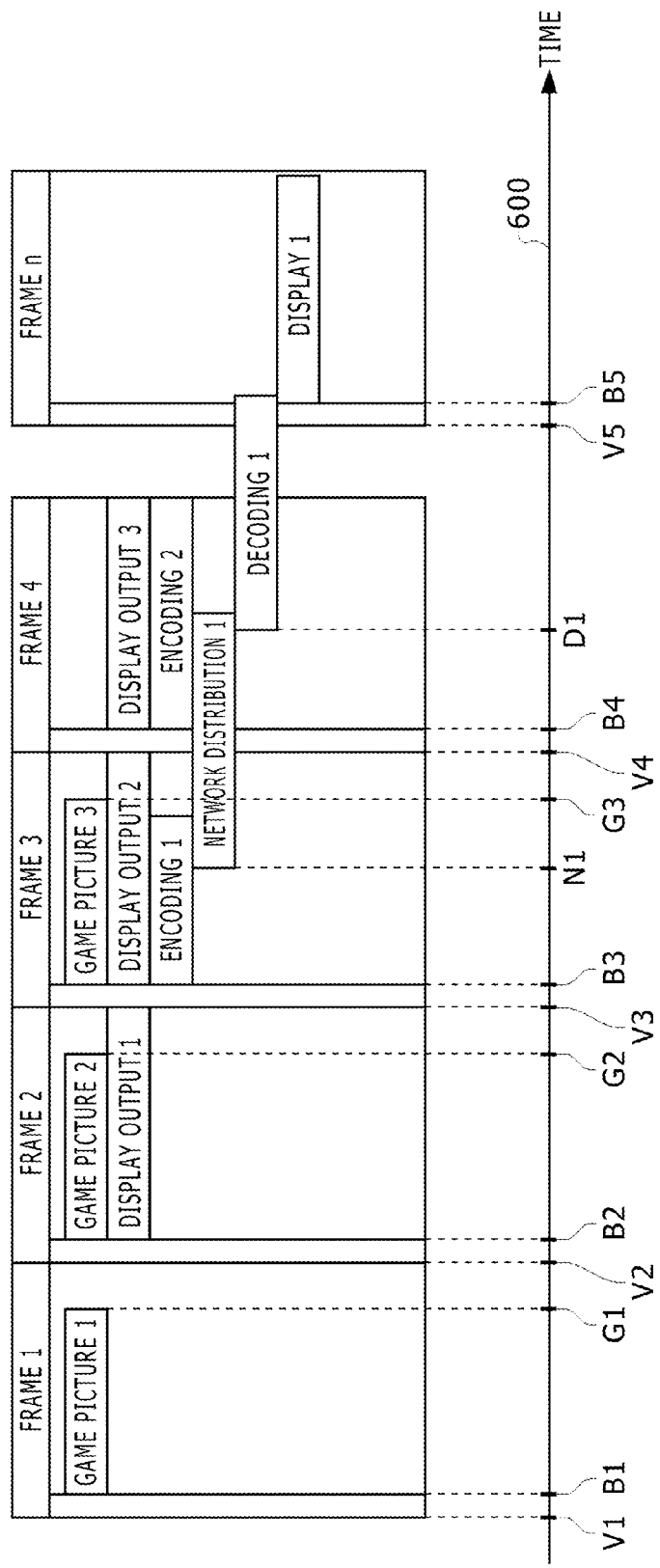
FIG. 3 is a diagrammatic view schematically illustrating a flow of provision of a game picture in a configuration of a game providing server depicted in FIG. 2.

FIG. 3 schematically illustrates a flow of provision of a game picture in the configuration of the game providing server 410 depicted in FIG. 2 and illustrates elapsed time of generation, encoding, distribution and so forth of a picture. In FIG. 3, the axis 600 of abscissa is a time axis indicative of the lapse of time.

A game to be provided by the game providing server 410 is generally created so as to display a picture in synchronism with a vertical synchronizing signal which is a video synchronizing signal. In such a game as just described, the graphics processor 420 starts rendering of a game picture using the vertical synchronizing signal generated by the display controlling unit 440 as a trigger. In FIG. 3, the display controlling unit 440 generates a vertical synchronizing signal at time points V1, V2, V3 and V4. It is to be noted that, at a time point V5, the display controlling unit not depicted of the client apparatus 300 generates a vertical synchronizing signal for displaying a game picture on the client apparatus 300. In FIG. 3, time periods V1 to B1, V2 to B2, V3 to B3, V4 to B4 and V5 to B5 are blanking periods within which no picture is rendered and are "VBLANK" periods.

When rendering of a game picture is completed and outputting of a picture of a game is completed, then the graphics processor 420 issues a frame switching instruction to the display controlling unit 440. FIG. 3 indicates that the graphics processor 420 starts rendering of a game picture 1 at time point B1 and then ends the rendering of a game picture at time point G1. Similarly, the graphics processor 420 starts rendering of a game picture 2 and another game picture 3 at time points B2 and B3 and ends the rendering of the game picture 2 and the game picture 3 at time points G2 and G3, respectively.

After a frame switching instruction issued by the graphics processor 420 is received, the display controlling unit 440 starts outputting of a frame of a game picture stored in the memory 430 to the picture capturing unit 450. In FIG. 3, since the graphics processor 420 ends generation of the game picture 1, for example, at time point G1, the graphics processor 420 issues the frame switching instruction to the display controlling unit 440. However, even if the frame switching instruction is received from the graphics processor 420, the display controlling unit 440 does not immediately output a picture of the game to be displayed to the picture capturing unit 450.

Instead, the display controlling unit 440 outputs a picture of the game to be displayed to the picture capturing unit 450 using generation of a vertical synchronizing signal as a trigger. Therefore, within a period after time point G1 at which the graphics processor 420 ends the generation of the game picture 1 till time point V2 at which the display controlling unit 440 generates a vertical synchronizing signal, the game picture 1 remains stored in the memory 430 and is not processed. Therefore, the period from time point G1 to time point V2 within which no processing is carried out can make a factor which decreases the through-put of the game providing server 410 and increases the latency. This similarity applies also within another time period from time point G2 to time point V3 and a further time period from time point G3 to time point V4.

After the display controlling unit 440 completes the outputting of the game picture 1 to be displayed at time point V3, namely, after the display controlling unit 440 carries out a scaling process of the game picture 1 and a conversion process of the color system of the game picture 1 and the picture capturing unit 450 completes capturing of the game picture 1 after processed, the encoding unit 460 starts encoding of the game picture 1. Thereafter, since the encoding unit 460 completes the encoding of data of a predetermined amount, which makes a unit of distribution, at time point N1, the encoded game picture 1 is sent to the client apparatus 300 through the network 200. At time point D1, the client apparatus 300 starts decoding of the acquired encoded data, and at time point B5, the rendered game picture 1 is finally displayed on the monitor of the client apparatus 300.

When the display controlling unit 440 starts outputting of the game picture 1 to be displayed at time point B2, the graphics processor 420 simultaneously starts rendering of a game picture 2 following the game picture 1. Further, at time point B3, the graphics processor 420 starts rendering of a game picture 3; the display controlling unit 440 starts outputting of the game picture 2 to be displayed; and the encoding unit 460 starts encoding of the game picture 1. In this manner, the graphics processor 420, display controlling unit 440 and encoding unit 460 can execute tasks allocated thereto in parallel to one another, and this contributes to reduction of the latency. However, since starting of the tasks is triggered by the vertical synchronizing signal generated by the display controlling unit 440, waiting time for the processes by the components appears and makes a cause of increase of the latency.

The inventor of the present technology has recognized the possibility that, by starting conversion of the color system or encoding of a game picture without depending upon the vertical synchronizing signal generated by the display controlling unit 440, the latency can be reduced in the entire cloud gaming system 400.

Figure 4:
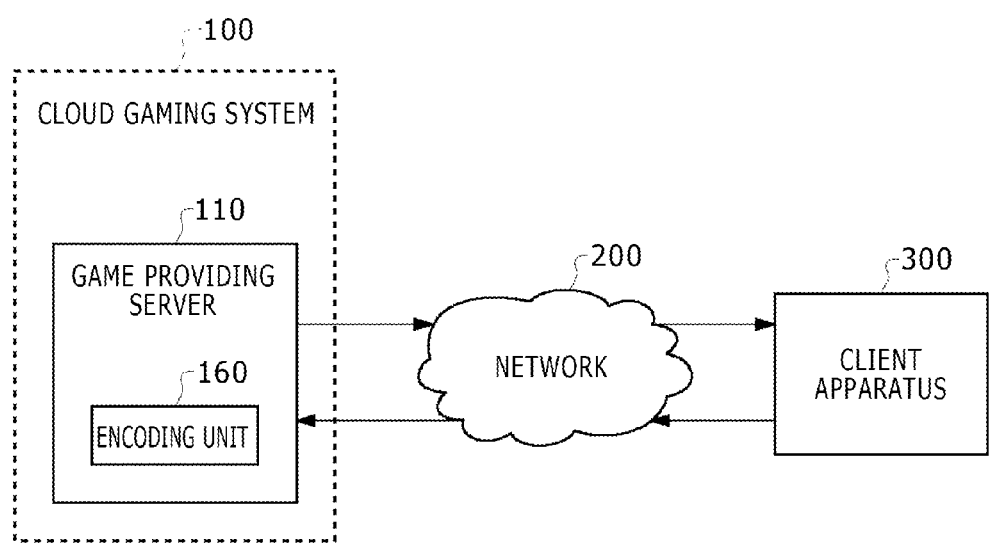
FIG. 4 is a block diagram depicting a cloud gaming system according to an embodiment and a client apparatus connected to the cloud gaming system through a network.

FIG. 4 depicts a cloud gaming system 100 according to an embodiment and a client apparatus 300 which connects to the cloud gaming system 100 through a network 200. Referring to FIG. 4, the network 200 and the client apparatus 300 are the same as the network 200 and the client apparatus 300 depicted in FIG. 1, respectively. On the other hand, the cloud gaming system 100 in the embodiment depicted in FIG. 4 is different from the general cloud gaming system 400 depicted in FIG. 1 and is configured so that a game providing server 110 and an encoding unit 160 are integrated with each other.

FIG. 5 schematically depicts an internal configuration of a system-on-chip (System on a Chip; SoC) 112 which implements functions of the game providing server 110 according to the embodiment. Both of a graphics processor 120 and the encoding unit 160 are implemented by hardware. As depicted in FIG. 5, the graphics processor 120 and the encoding unit 160 are mounted on the system-on-chip 112 which is one chip. Therefore, transfer of data between the graphics processor 120 and the encoding unit 160 is carried out at a high speed in comparison with that where the graphics processor 120 and the encoding unit 160 are mounted on different chips from each other.

It is to be noted that, in FIG. 5, only two functional components of the graphics processor 120 and the encoding unit 160 on the system-on-chip 112 are depicted while the other components are omitted for the convenience of illustration. However, as a circuit configuration upon implementation, also a CPU, buses and various controllers are included. Details of the circuit configuration of the system-on-chip 112 are hereinafter described.

Also the graphics processor 120 in the present embodiment is implemented by a GPU similarly to the graphics processor 420 described hereinabove and incorporates a plurality of computing units specialized for graphics shading. A computing unit specialized for graphics shading is also called shader and is used principally for calculation of a color of an object of a rendering target. The graphics processor 120 in the embodiment includes a known programmable shader and can be utilized not only for rendering of a picture but also for other numerical calculation.

Therefore, the graphics processor 120 in the embodiment uses a built-in programmable shader to execute a scaling process of picture data. Scaling of picture data can be implemented using known linear interpolation or spline interpolation. More particularly, the scaling of picture data can be implemented by dividing picture data into a plurality of processing units and by pipeline processing the processing units using the programmable shader.

The graphics processor 120 further converts the color system of picture data using the built-in programmable shader. More particularly, the graphics processor 120 converts picture data of the RGB color system into picture data of the YUV color system, which can be handled by the encoding unit 160, using the built-in programmable shader. This can be implemented by calculation of a known transformation matrix of three rows and three columns. Therefore, the graphics processor 120 in the embodiment has functions as a game picture generation unit 122 for generating a picture of a game, a picture scaling unit 124 for executing scaling of a picture of a game and a color system conversion unit 126 for converting the color system of a picture of a game.

In this manner, different from the graphics processor 420 depicted in FIG. 2, the graphics processor 120 in the embodiment does not pass a picture of a game generated by rendering to the display controlling unit 440. Instead, the graphics processor 120 uses the programmable shader built therein to execute scaling and color system conversion of a picture of a game. Consequently, scaling or color system conversion of a picture of a game can be started without depending upon a vertical synchronizing signal generated by the display controlling unit 440 and without waiting the vertical synchronizing signal. Therefore, it is possible to reduce the latency.

Figure 6:
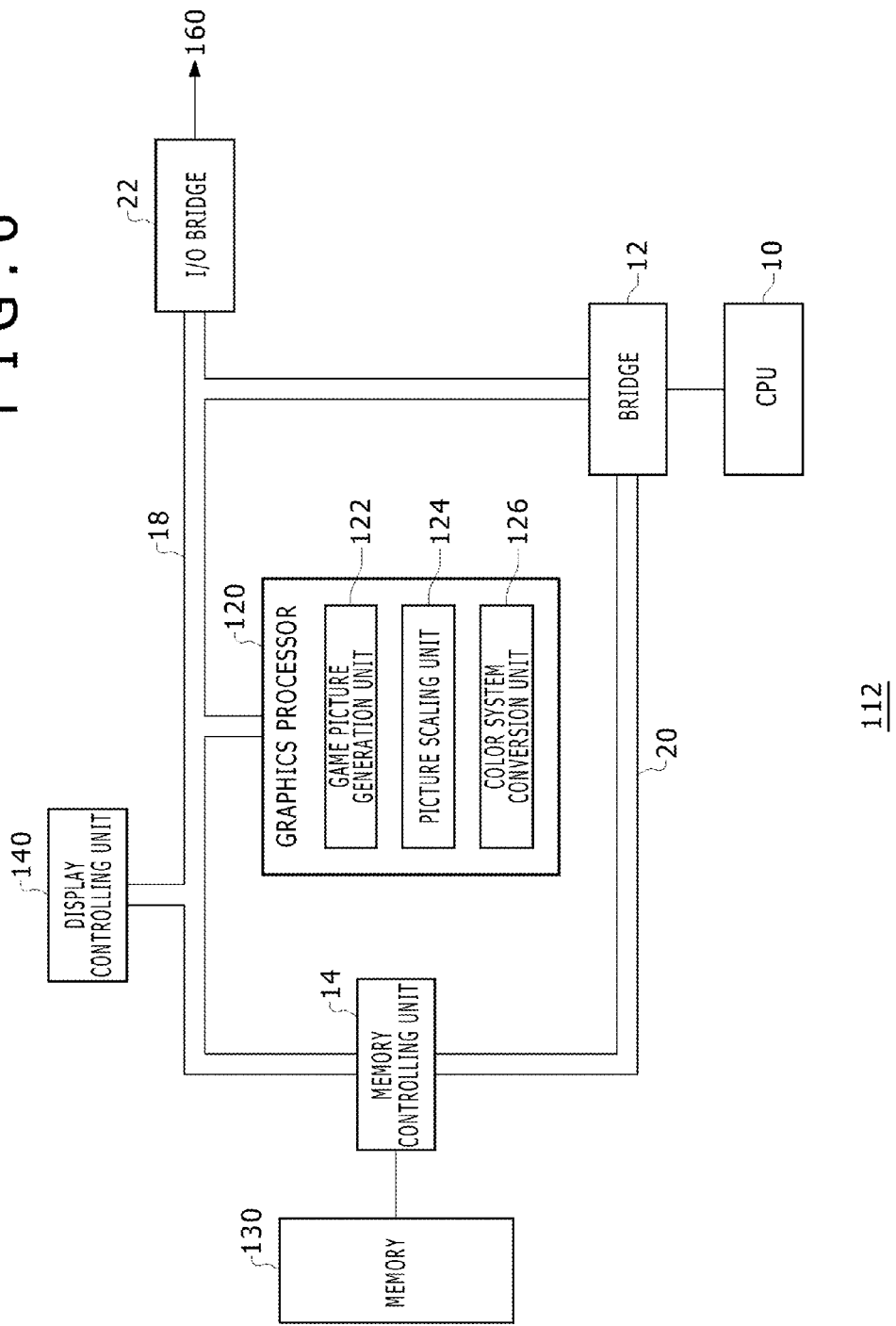
FIG. 6 is a block diagram schematically depicting a circuit configuration of the system-on-chip depicted in FIG. 5.

FIG. 6 schematically depicts a circuit configuration of the system-on-chip 112 in the embodiment. Referring to FIG. 6, the system-on-chip 112 in the embodiment includes a CPU 10 and the graphics processor 120 mounted on the same chip. The graphics processor 120 is connected to the CPU 10 through a bus 18. The graphics processor 120 is connected also to a memory 130 through the bus 18. The bus 18 which interconnects the memory 130, graphics processor 120 and CPU 10 is hereinafter referred to as GPU bus 18.

The CPU 10 is connected to the memory 130 through a bus 20. The bus 20 which interconnects the CPU 10 and the memory 130 is hereinafter referred to as CPU bus 20. Since the CPU 10 is connected to the GPU bus 18 and the CPU bus 20 in this manner, the CPU 10 is connected to the buses through a bridge 12. Further, the memory 130 is connected to the GPU bus 18 and the CPU bus 20. Therefore, transfer of data between the memory 130 and the CPU 10 or the graphics processor 120 is executed through a memory controlling unit 14.

The graphics processor 120 and the CPU 10 can share data stored in the memory 130. Since tight data exchange can be carried out between the graphics processor 120 and the CPU 10, a high through-put can be implemented in comparison with that in an alternative case in which the graphics processor 120 and the CPU 10 are mounted on different boards from each other.

Data stored in the memory 130 is transferred to the encoding unit 160 through an I/O (Input/Output) bridge 22.

The game picture generation unit 122 in the graphics processor 120 generates a picture of a game to be distributed to the client apparatus 300 through the network 200. The game picture generation unit 122 stores the generated picture data into the memory 130. The picture scaling unit 124 in the graphics processor 120 converts the size of picture data of a predetermined data amount using it as a trigger that picture data of the predetermined data amount is stored into the memory 130. Here, the "predetermined data amount" is a unit amount of data to be handled by the encoding unit 160 and is a unit amount by which a compression video stream of picture data is to be generated. For the convenience of description, the predetermined data amount is hereinafter referred to sometimes as "slice unit." Although the "slice unit" may be determined taking a processing capacity of the encoding unit 160 and so forth into consideration and is an amount including a plurality of macro blocks including 16 pixels in the vertical direction and 16 pixels in the horizontal direction. It is to be noted that also a display controlling unit 140 is connected to the GPU bus 18, and the game picture generation unit 122 generates a picture of a game in accordance with a vertical synchronizing signal generated by the display controlling unit 140.

The color system conversion unit 126 in the graphics processor 120 converts the color system of picture data after the size conversion by the picture scaling unit 124. It is to be noted that, when the size conversion by the picture scaling unit 124 is not required, the color system conversion unit 126 converts the color system of picture data using it as a trigger that picture data of a predetermined data amount is stored into the memory 130. Here, the color system conversion unit 126 converts picture data stored in the memory 130 into picture data of a color system which can be encoded by the encoding unit 160. In other words, the color system conversion unit 126 utilizes the memory 130 as it is as a working area. Consequently, in comparison with an alternative case in which conversion of the color system is executed in some other working area, the time required for transfer of data can be suppressed, and this contributes to reduction of the latency. The color system which can be encoded by the encoding unit 160 is, for example, the YUV color system.

As described above, the picture scaling unit 124 or the color system conversion unit 126 is implemented by a programmable shader. The processing unit of the programmable shader is the slice unit described above. A picture generated by the game picture generation unit 122 is divided into slice units, and a result of processing of the slice units is written into the memory 130. At the point of time at which a processing result of the slice units is written into the memory 130, the graphics processor 120 issues a synchronizing signal to the encoding unit 160. The encoding unit 160 starts encoding using reception of the synchronizing signal issued by the graphics processor 120 as a trigger. It is to be noted that, for the synchronizing process between the graphics processor 120 and the encoding unit 160, a high-speed process such as, for example, a semaphore is used.

The encoding unit 160 which receives the synchronizing signal reads out picture data of a slice unit generated by the graphics processor 120 and generates a compression video stream. After the compression video stream generation of the slice unit is completed, the encoding unit 160 generates a synchronizing instruction to the CPU 10. For the synchronizing instruction from the encoding unit 160 to the CPU 10, a semaphore through a shared memory is used in addition to interruption. The CPU 10 transmits the compression video data in the slice unit to the client apparatus 300 through the network 200.

FIG. 7 schematically illustrates a flow of provision of a game picture in the configuration of the game providing server 110 depicted in FIG. 4. Similarly as in FIG. 3, the axis 600 of abscissa in FIG. 7 is a time axis depicting a flow of time.

Generally, a game is created such that a picture is displayed in synchronism with a vertical synchronizing signal. Accordingly, also the game providing server 110 provides a game created so as to display a picture in synchronism with a vertical synchronizing signal. In FIG. 7, the display controlling unit 140 generates a vertical synchronizing signal at time points V1 and V2. It is to be noted that, at time point V5, a display controlling unit not depicted of the client apparatus 300 generates a vertical synchronizing signal for displaying a game picture on the client apparatus 300. In FIG. 7, a time period from time point V1 to time point B1, a time period from time point V2 to time point B2 and a time period from time point V5 to time point B5 are VBLANK periods.

At time point G1, the game picture generation unit 122 completes rendering of a game picture and ends outputting of the game picture to the memory 130. When the game picture generation unit 122 completes the rendering of the game picture, the picture scaling unit 124 and the color system conversion unit 126 start scaling of the game picture and conversion of the color system of the game picture, respectively, irrespective of whether or not the display controlling unit 140 generates a vertical synchronizing signal. The scaling of a game picture and the conversion of the color system of a game picture are hereinafter referred to generally as "format conversion." In FIG. 7, the format conversion by the picture scaling unit 124 or the color system conversion unit 126 is started at a substantially same timing as time point G1.

As described hereinabove, the picture scaling unit 124 or the color system conversion unit 126 starts format conversion in a slice unit which is a processing unit of the encoding unit 160. Accordingly, the encoding unit 160 starts encoding immediately after the format conversion is completed in a slice unit. Therefore, the time period from time point G1 to time point F1 within which format conversion for the game picture 1 is executed and the time period from time point E1 to time point E2 within which encoding of the game picture 1 is executed substantially overlap with each other and parallel processing is carried out.

Since compression video stream generation of a slice unit is completed at time point N1, the encoding unit 160 generates a synchronizing instruction to the CPU 10. Therefore, at time point N1, the encoded game picture 1 begins to be distributed to the client apparatus 300 through the network 200. At time point D1, the client apparatus 300 starts decoding of the acquired encoded data, and the rendered game picture 1 is displayed for the first time at time point B5 on the monitor of the client apparatus 300.

In this manner, the game providing server 110 in the embodiment can start format conversion and encoding of a game picture without depending upon a vertical synchronizing signal generated by the display controlling unit 140.

Therefore, in comparison with an alternative case in which format conversion or encoding of a game picture is started using a vertical synchronizing signal as a trigger, the waiting time for processing by the components is not generated. Consequently, the latency can be reduced.

As described above, with the game providing server 110 according to the embodiment, a technology which reduces latency in a cloud gaming service can be provided.

While a preferred embodiment of the present technology has been described using specific terms, such description is for illustrative purposes only, and it is to be understood that changes and variations may be made without departing from the spirit or scope of the following claims.

The present disclosure contains subject matter related to that disclosed in Japanese Priority Patent Application JP 2014-075606 filed in the Japan Patent Office on Apr. 1, 2014, the entire content of which is hereby incorporated by reference.

What is claimed is:

1. A game providing server, comprising:
a graphics processor configured to generate, upon receipt, for each of a plurality of sequential frames, of a synchronization signal designating the frame, a picture, associated with the frame, of a game, to be distributed to a client through a network; and
a memory configured to store picture data generated by the graphics processor;
the graphics processor configured to convert a color system of the picture data of a predetermined data amount using it as a trigger that the picture data of the predetermined data amount is stored into the memory; wherein
the graphics processor is configured to begin, for each of the frames, the conversion of the color system of the picture data of the picture associated with the frame, prior to receipt of the synchronization signal of a next frame of the frames.

2. The game providing server according to claim 1, further comprising
an encoding unit configured to covert picture data of a predetermined color system into encoded data to be used upon distribution to the client through the network;
the graphics processor changing the picture data stored in the memory into picture data of a color system which can be encoded by the encoding unit.

3. The game providing server according to claim 2, wherein the encoding unit starts encoding using reception of a synchronizing signal issued by the graphics processor as a trigger.

4. The game providing server according to claim 2, wherein
the encoding unit is implemented by hardware; and
the graphics processor and the hardware which implements the encoding unit are mounted on the same chip.

5. The game providing server according to claim 1, wherein the graphics processor converts a size of the picture data of the predetermined data amount and converts the color system of the picture data after the conversion.

* * * * *